United States Patent
Mahn et al.

(10) Patent No.: US 7,060,902 B2
(45) Date of Patent: Jun. 13, 2006

(54) BUSHING

(75) Inventors: Gildo Mahn, Charneca da Caparica (PT); Achim Milbich, Waghaeusel (DE)

(73) Assignee: Siemens Aktiengesellschaft, Munich (DE)

( * ) Notice: Subject to any disclaimer, the term of this patent is extended or adjusted under 35 U.S.C. 154(b) by 59 days.

(21) Appl. No.: 10/497,994

(22) PCT Filed: Dec. 13, 2002

(86) PCT No.: PCT/DE02/04687

§ 371 (c)(1),
(2), (4) Date: Jun. 8, 2004

(87) PCT Pub. No.: WO03/052893

PCT Pub. Date: Jun. 26, 2003

(65) Prior Publication Data

US 2005/0067182 A1    Mar. 31, 2005

(30) Foreign Application Priority Data

Dec. 14, 2001   (DE)   ................... 101 64 563

(51) Int. Cl.
*H02B 1/20*   (2006.01)
*H02G 5/00*   (2006.01)

(52) U.S. Cl. .............. 174/72 B; 174/68.2; 174/99 B

(58) Field of Classification Search ............ 174/65 G, 174/65 SS, 70 B, 71 B, 72 B, 99 B, 137 R, 174/138 E, 138 G, 138 R, 140 R, 142, 144, 174/149 B, 152 R, 152 G, 153 G, 154, 166 S, 174/68.2; 361/611, 640
See application file for complete search history.

(56) References Cited

U.S. PATENT DOCUMENTS

| | | | | |
|---|---|---|---|---|
| 2,611,002 | A * | 9/1952 | James .................... | 174/152 R |
| 3,243,835 | A * | 4/1966 | Armentrout et al. .... | 174/153 G |
| 3,801,727 | A * | 4/1974 | Wilkinson et al. .......... | 174/142 |
| 4,000,829 | A * | 1/1977 | Johnson et al. ......... | 174/153 G |
| 5,083,477 | A * | 1/1992 | Geil ........................... | 74/553 |
| 5,530,205 | A * | 6/1996 | Parks et al. ............... | 174/99 B |
| 5,569,891 | A * | 10/1996 | Freeman et al. .......... | 200/17 R |
| 5,635,674 | A * | 6/1997 | Owen ..................... | 174/152 R |
| D411,508 | S * | 6/1999 | Spillyards .................. | D13/118 |
| 6,150,607 | A * | 11/2000 | Weyl et al. ............... | 174/65 G |
| 6,372,994 | B1 * | 4/2002 | Servies ................... | 174/152 R |
| 6,936,770 | B1 * | 8/2005 | Takedomi et al. ........ | 174/65 G |

FOREIGN PATENT DOCUMENTS

| | | |
|---|---|---|
| DE | 35 15 421 | 2/1987 |
| DE | 36 39 626 | 6/1988 |
| DE | 199 52 431 | 5/2001 |
| EP | 0 199 891 | 11/1986 |
| EP | 0 667 663 | 8/1995 |
| EP | 0 993 005 | 4/2000 |

* cited by examiner

*Primary Examiner*—Dean A. Reichard
*Assistant Examiner*—Adolfo Nino
(74) *Attorney, Agent, or Firm*—Morrison & Foerster, LLP

(57) ABSTRACT

The invention relates to a bushing (1) for supporting electric conductors. Said bushing contains a flange section (2), a corrugated section (3), which projects above the flange section in the longitudinal direction of the electric conductor, in addition to at least one retaining section (4), which has bushing orifices (7) that are open on both sides for receiving busbars. The aim of the invention is to reduce the production costs and simplify the assembly of a bushing of this type. To achieve this, the bushing (1) is configured in one-piece, each retaining section (4) being solely supported on the flange section (2) by means of the corrugated section (3).

11 Claims, 2 Drawing Sheets

BUSHING

CLAIM FOR PRIORITY

This application claims priority to International Application No. PCT/DE02/04687 Dec. 13, 2002 which was published in the German language on Jun. 26, 2003, which claims the benefit of priority to German Application No. 101 64 563.5, which was filed in German language on Dec. 14, 2001.

TECHNICAL FIELD OF THE INVENTION

The invention relates to a bushing for supporting electrical conductors, and in particular, to common electrical conductors in air-insulated medium-voltage assemblies.

BACKGROUND OF THE INVENTION

Bushings make it possible to pass electrical conductors through an area having a different potential, and in the process to isolate these two components from one another. In particular in medium-voltage assemblies which are made up of two or more switching panels it is also desirable for bushings between the switching panels to be designed such that, in the event of an arcing fault, the effects of this fault remain limited to a specific switching panel. Bushings of this type must therefore be capable of withstanding the pressure produced in the event of an arc in order to prevent the conductors from bending, resulting in an increase in the size of the clearance, or in order to prevent the arc from migrating to other switching panels.

Conventionally, bushings comprise a fastening plate, which is made of metal or insulating material, and a cast-resin section having bushing openings. The cast-resin section serves the purpose of dissipating the electrical field, and of extending the creepage path, which extends over the surface of the cast-resin section, from the busbar to the encapsulating housing of the assembly. However, such bushings which are previously known have the disadvantage that the cast-resin section is not connected in a force-fitting manner to the fastening plate. Owing to this lack of mechanical robustness, the repulsive or attractive forces occurring in the event of a short circuit between the current-carrying conductors can no longer be absorbed. According to the prior art, cast-resin supports are therefore provided for the purpose of improving the support of the cast-resin section on the fastening plate. However, these additional components increase the manufacturing, maintenance and assembly complexity of bushings.

It has widely been known to use a bushing which has been manufactured from a plastic material and has elevations for the purpose of increasing the size of the creepage path. In order to absorb the forces occurring in the event of a short circuit, this previously known bushing is also provided with cast-resin supports which make the production, assembly and maintenance of the bushing more complicated.

DE 36 39 626 A1 discloses a bushing manufactured from rubber having a fastening flange for the purpose of attaching the bushing to a wall of a switching panel in medium-voltage switchgear assemblies. The bushing disclosed here comprises an insulating body which has an axial cavity which is open on both sides for accommodating an electrical conductor in the form of a rod. Annular outer ribs are provided for the purpose of increasing the creepage path between the conductor and the wall, which is at a different potential. Integrally formed on the side of the flange section which is remote from the annular outer ribs is an annular screen in the form of a collar, which radially delimits an end-side recess in the flange and likewise serves the purpose of increasing the creepage path. However, this described bushing has, on both sides of the fastening flange, extensions extending along the conductors to be accommodated, with the result that, owing to the bulkiness of the bushing, the components adjacent to the wall can only be mounted with a clearance.

DE 35 15 421 discloses a bushing which is composed of an inner external cone and an outer external cone. Provided within these external cones is an axial cavity for accommodating an electrical conductor. This bushing also extends on both sides of a wall, through which the electrical conductor is intended to be passed.

SUMMARY OF THE INVENTION

The invention provides a bushing which allows for an arrangement, which is as compact as possible, of other elements even in the direct vicinity of the bushing, with which the bushing can be produced and assembled easily.

In one embodiment of the invention, there is a bushing for supporting electrical conductors having a flange section, a folded section, which projects beyond the flange section in the longitudinal direction of the electrical conductors, and at least one retaining section, which has through-openings which are open on both sides and are provided for accommodating the electrical conductors, in which the bushing is of integral design, and each retaining section is supported on the flange section exclusively by means of the folded section.

The integral form of the bushing allows not only for a particularly simple and economic production of the bushing, but also for simple assembly. For this purpose, the flange section of the bushing is fixed to the housing wall, for example of a medium-voltage switchgear assembly, the busbars or busbar runs being pushed into the through-openings. Additional components for the purpose of making the bushing mechanically robust are now superfluous to the invention.

The folded section of the bushing according to the invention provides the creepage paths for both sides of the bushing which are required for preventing an undesired flow of current, but the folded section extends, starting from the flange section, in one direction along the electrical conductors to be accommodated and, for example, into an encapsulated, air-insulated switching panel. Further components can therefore be arranged in the immediate vicinity of the switching panel, which, according to the invention, makes a compact design possible.

The folded section is preferably designed such that, in the region of the through-opening, the retaining section is arranged on the plane which is defined by the side of the flange section which is remote from the folded section. This results in the formation of a virtually flat bearing surface, which is interrupted only by a cavity, which is closed on one side and is delimited by the folded section.

The configuration of the bushing, and in particular the dimensions of the retaining section in the longitudinal direction of the electrical conductors, is advantageously matched to the currents occurring in the event of a short circuit and to forces produced as a result. Critical to this matching is, firstly, the selection of the material, in which material properties, such as, for example, bending moduli, elasticity, compression load and the like, are to be optimized, with a view to mechanical robustness for the bushing which is as high as possible. However, the robustness of the bushing is also determined by the geometric arrangement and configuration of the individual sections and thus influencing variables such as, for example, stabilizing bridges, the number, arrangement and configuration of the retaining sections, the number of through-openings and the like.

In one preferred embodiment, three retaining sections are provided which are arranged offset with respect to one another on a plane which extends transversely to the longitudinal direction of the electrical conductors, resulting in a triangle arrangement. Advantageously, the retaining sections are not spaced too far apart from one another, with the result that the folded section surrounds them, without any essential changes to its radius of curvature or other configuration, in the form of a closed, circumferential contour. This prevents the formation of subregions of the folded section which are completely isolated from one another in regions which are set back to the plane of the flange section. In this context, however, reference should be made to the fact that folded sections such as this having elevated subregions which are isolated from one another are also the subject matter of the present invention.

In one expedient embodiment, a mechanically stabilizing bridge section is integrated in the folded section and does not delimit a retaining region but does delimit a distance region which is formed without a through-opening. The bridge section reinforces the folded section by shortening its outer circumference.

Each retaining section may have one or more through-openings depending on the respective current level. In this case, the through-openings are matched to the outer contour of the busbar, resulting in the required support and robustness, but at the same time making it possible for the busbar to be pushed into the through-opening by hand. In one preferred embodiment, three through-openings are provided.

The bushing according to the invention is preferably manufactured from fiber-reinforced plastic, although other materials may be used. In one embodiment in this regard, the fiber-reinforced plastic is a fiber-reinforced polyester. In one preferred refinement, the bushing according to the invention is, produced from glass fiber-reinforced polyester.

The side walls of the folded section need not extend parallel to one another. In the context of the invention, it is perfectly possible for them to cover an angle of between 1° and 10°. The radius of the bent, rounded section on the closed side of the folded section is, for example, between 6 and 14 millimeters.

The retaining sections expediently have rounded corner regions, since this rounded configuration increases the robustness of the retaining section. In the context of the invention, it is of course also possible for the retaining section to be circular.

In one development of the invention, the layer thickness of the bushing is between 5 and 10 mm.

BRIEF DESCRIPTION OF THE DRAWINGS

The invention is described below using exemplary embodiments with reference to the figuresg, in which the same reference numerals are used for corresponding components, and in which.

DEATILED DESCRIPTION OF THE INVENTION

Figure 1:
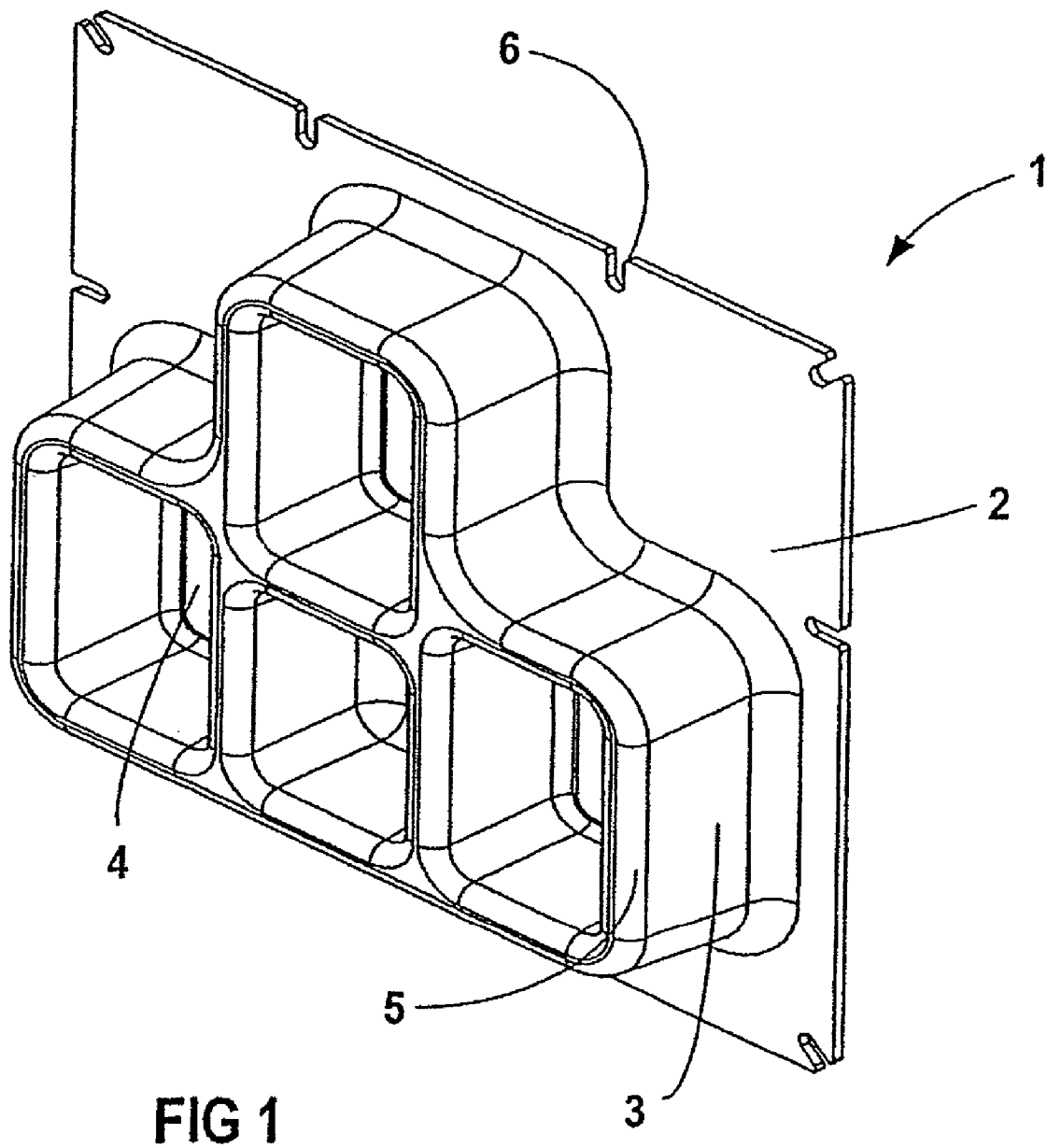
FIG. 1 shows a perspective illustration of an exemplary embodiment of the bushing according to the invention.

FIG. 1 shows a perspective illustration of an exemplary embodiment of the bushing 1 according to the invention. The bushing 1 comprises a flange section 2 in the form of a plate and having two surfaces runing parallel to one another, a folded section 3 and a retaining section 4. The folded section 3 is integrally formed on the flange section 2 and extends from the flange section 2 in the axial direction to a bent, rounded section 5. From here, the folded section 3 proceeds axially such that it is set back into the retaining section 4, which is essentially arranged at the same axial level as the flange section 2.

The flange section 2 has notches 6, which make it possible to attach the bushing 1 to the wall (not shown) of a switching panel in a particularly simple manner. The wall expediently has a recess, whose extent corresponds to the outer contour of the folded section, with the result that, once the bushing has been fixed to the wall, the folded section 3 extends into the housing of the voltage field.

Figure 2:
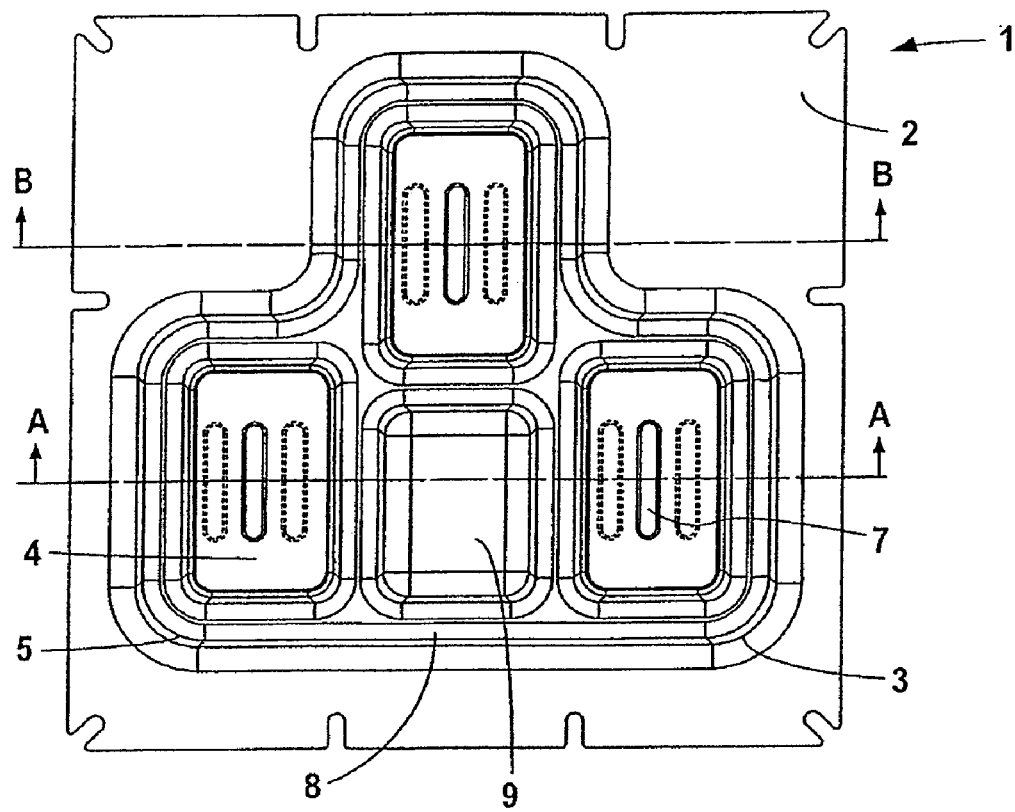
FIG. 2 shows a plan view of the bushing shown in FIG. 1.

FIG. 2 shows a plan view of the bushing shown in FIG. 1. It can be seen that the retaining section 4 has a through-opening 7 which is provided for the purpose of accommodating a busbar. In addition to the through-opening 7 shown by continuous lines, two further through-openings 7 shown by dashed lines can be seen. This illustration is intended to show that the bushing according to the invention may also be used for accommodating busbar runs, comprising, for example, three busbars which extend parallel to one another. In this case, as is shown, three through-openings 7 which extend parallel to one another would be provided in the retaining section 4.

The through-openings 7 are in the form of slots and have two side walls which extend parallel to one another and are connected to one another by means of rounded narrow sides.

The clearance between the parallel side walls and the clearance and the radius of the rounded section of the narrow sides is matched to the configuration and dimensions of the busbar such that it is possible to insert the busbar into the through-opening 7, but at the same time to provide a retaining contact which is necessary for making it mechanically robust.

In the exemplary embodiment shown in FIG. 2, three retaining sections 4 are provided for the purpose of supporting three individual busbars having different voltage phases. For the purpose of maintaining a clearance between the busbars which is as large as possible, a so-called triangular arrangement has been chosen for this bushing 1, in which the central retaining section 4 is offset with respect to its adjacent retaining sections 4 to the side or in other words on a plane which is aligned at right angles to the longitudinal direction of the conductors. In order to provide a creepage path which is as great as possible from the through-openings 7 to the adjacent busbars, on the one hand, and the wall of the switching panel, on the other hand, the retaining sections 4 are completely surrounded by the folded section 3 which extends in the axial direction. In the exemplary embodiment shown, the retaining sections are, however, arranged so close to one another that there is a bent, rounded section adjacent to two retaining sections 4 in the corner regions.

In order to increase the mechanical robustness of the bushing 1, the folded section 3 was not interrupted between the lower retaining sections 4 which are arranged at one level but was continuous so as to form a bridge 8. This results in the formation of a distancing region 9, which is likewise surrounded by the folded section 3, but which does not have a through-opening 7 for retaining live busbars.

The retaining sections 4 and thus the folded sections 3 have rounded corners in order to prevent the formation of edges which reduce the robustness of the bushing.

Figure 3:
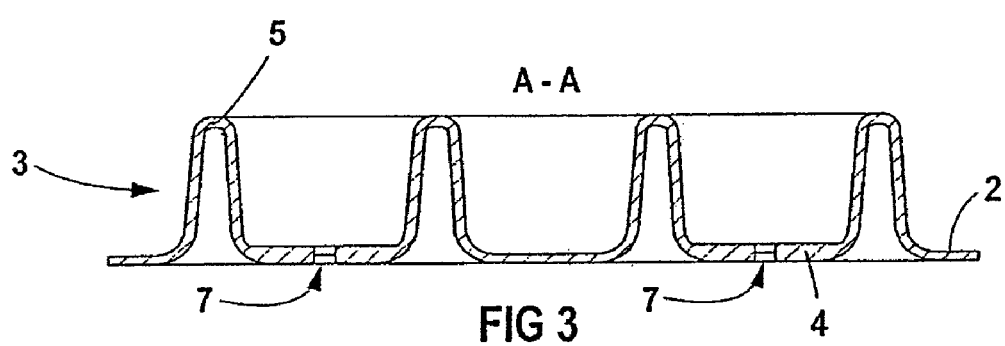
FIG. 3 shows a sectional view of the bushing along the line A—A shown in FIG. 2.

FIG. 3 shows a sectional view of an exemplary embodiment of the bushing 1 according to the invention along the line A—A in FIG. 2. It can be seen in this illustration in particular that the retaining section 4 is connected to the flange section 2 exclusively via the folded section 3. The folding of the folded section 3 produces sufficiently great creepage paths between conductors having different potentials on both sides of the bushing 1, in order to prevent an undesired flow of current through the bushing 1. The sides of the flange section 2 and the retaining section 4 which are remote from the folded section 3 lie on one plane. This configuration meets two objectives. Firstly, creepage paths which are as great as possible are produced. Secondly, this achieves a compact design for the bushing 1 with a flat bearing surface which is as large as possible.

The bushing 1 shown in the figures as the exemplary embodiment of the invention could be manufactured in a simple manner by pressing. A glass fiber-reinforced polyester, which can be obtained, for example, from the US company Haysite, was used as the production material.

Figure 4:
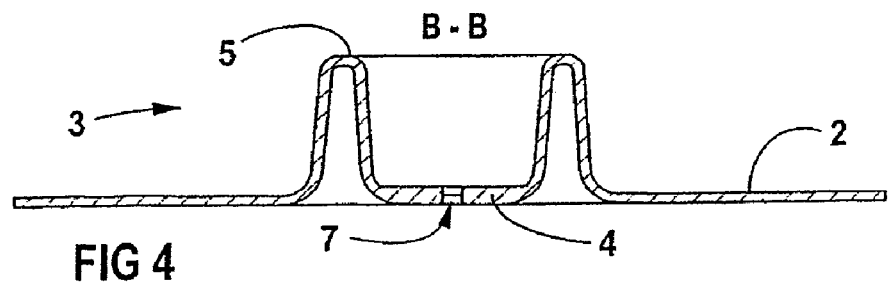
FIG. 4 shows a sectional view of the bushing along the line B—B shown in FIG. 2.

FIG. 4 shows a sectional view of the bushing 1 shown along the line B—B in FIG. 2. It can be seen that the thickness of the flange section 2 and of the retaining section 4 is different. In the exemplary embodiment shown, the flange section 2 has a thickness of 7 mm. The retaining section 4 is more robust. Its thickness is 12 mm.

With the exemplary embodiment of the bushing according to the invention shown in the figures, arcing faults could successfully be limited to a specific region of the busbar, even at sudden short circuit currents of 135 kV.

LIST OF REFERENCE NUMERALS

1 Bushing
2 Flange section
3 Folded section
4 Retaining section
5 Bent, rounded section
6 Notches
7 Through-opening
8 Bridge
9 Distancing region

What is claimed is:

1. A bushing for supporting electrical conductors, comprising:
    a flange section;
    a folded section, which projects beyond the flange section in a longitudinal direction of the electrical conductors; and
    at least one retaining section, which has continuous through-openings provided for accommodating the electrical conductors, in which the bushing is of integral design, and each retaining section is supported on the flange section by the folded section, wherein
    the folded section forms a cavity between the flange section and the retaining section, the folded section being open on one side and closed on the other side.

2. The bushing as claimed in claim 1, wherein, in a region of the through-openings, the retaining section lies on a plane which is defined by a side of the flange section which is remote from the folded section.

3. The bushing as claimed in claim 1, wherein three retaining sections are provided.

4. The bushing as claimed in claim 3, wherein the retaining sections are arranged offset so as to form a triangle arrangement on a plane which extends at right angles to the longitudinal direction of the electrical conductors.

5. The bushing as claimed in claim 4, wherein the retaining sections are arranged such that the folded section surrounds them in a form of a closed, circumferential contour.

6. The bushing as claimed in claim 5, wherein a stabilizing bridge section is integrated in the folded section and delimits a distancing region, the distancing region having no through-openings.

7. The bushing as claimed in claim 6, wherein each retaining section has three through-openings.

8. The bushing as claimed in claim 7, wherein each retaining section has rounded corners.

9. The bushing as claimed in claim 1, wherein the bushing is produced from fiber-reinforced plastic.

10. The bushing as claimed in claim 9, wherein the fiber-reinforced plastic is a fiber-reinforced polyester.

11. The bushing as claimed in claim 10, wherein the fiber-reinforced polyester is a glass fiber-reinforced polyester.

* * * * *